2,906,746
METALLIFEROUS AZO DYESTUFFS

Jakob Brassel, Basel, and Arthur Buehler, Rheinfelden, Switzerland, assignors to Ciba Limited, Basel, Switzerland, a Swiss firm No Drawing. Application June 4, 1954
Serial No. 434,667

Claims priority, application Switzerland June 8, 1953

2 Claims. (Cl. 260—145)

This invention provides a process for the manufacture of valuable new metalliferous azo-dyestuffs, which contain one atom of metal bound in complex union with two molecules of different monoazo-dyestuffs, wherein a metallizable metal-free monoazo-dyestuff and a complex chromium or cobalt compound of a monoazo-dyestuff, which contains one atom of metal bound in complex union per molecule of dyestuff, are reacted together in a molecular ratio of about 1:1, and the dyestuffs used are free from functionally converted sulfonic acid and sulfone groups and from carboxylic acid groups in a position other than an ortho-position relatively to the azo linkage, and one of the two dyestuffs, advantageously that containing metal in complex union, contains a single free sulfonic acid group and the other dyestuff is free from sulfonic acid groups.

As starting materials for the present process there are advantageously used ortho:ortho'-dihydroxy-monoazo-dyestuffs and metal compounds thereof which contain one atom of metal bound in complex union per molecule of dyestuff (1:1 complexes). Alternatively, there may be used ortho-carboxy-ortho'-hydroxy-monoazo-dyestuffs or ortho-hydroxy-ortho'-amino-monoazo-dyestuffs and 1:1 complexes of these dyestuffs.

The monoazo-dyestuffs used in the process of this invention, on the one hand, in the metal-free form and, on the other, in the form of 1:1-metal complexes, can be made by methods in themselves known by coupling ortho-carboxy- or ortho-hydroxy-diazo-compounds, more especially those of the benzene or naphthalene series, with coupling components capable of coupling in ortho-position relatively to a hydroxyl or amino group or an enolizable keto group. As stated above, the components must be free from sulfone groups and functionally converted sulfonic acid groups, for example, sulfonic acid amide and sulfonic acid ester groups. They must also be free from carboxylic acid groups, with the exception of any such group as may be present in the diazo-component in ortho-position relatively to the diazotizable amino group. Furthermore, the components must be so chosen that only one of the two dyestuffs used contains a single free, that is to say, not functionally converted, sulfonic acid group, but which may be present in the form of an alkali sulfonate group. It is also of advantage to choose components which yield dyestuffs which contain no further hydroxyl groups in addition to the hydroxyl groups present in ortho-position relatively to the azo linkage and taking part in the formation of the complex. Taking into account these requirements there come into consideration for making the monoazo-dyestuffs, for example, the following components:

As diazo-compounds there are advantageously used those of ortho-carboxy-amines of the benzene series and especially ortho-hydroxy-amines of the benzene or naphthalene series, which may contain, in addition to the carboxyl or hydroxyl group and the amino group, further substituents such as nitro groups, halogen atoms (for example, chlorine), alkyl groups (for example, methyl), alkoxy groups (for example, methoxy) or acylamino groups, especially those containing few, that is to say, at most for example 4, carbon atoms (for example, acetylamino).

As examples there may be mentioned (a) amines free from sulfonic acid groups:

2-aminobenzoic acid,
5-chloro-2-aminobenzoic acid,
4- or 5-chloro-2-amino-1-hydroxybenzene,
4-, 5- or 6-nitro-2-amino-1-hydroxybenzene,
4:6-dichloro-2-amino-1-hydroxybenzene,
3:4:6-trichloro-2-amino-1-hydroxybenzene,
4-chloro-5- or 6-nitro-2-amino-1-hydroxybenzene,
4-nitro-6-chloro-2-amino-1-hydroxybenzene,
6-nitro-4-methyl-2-amino-1-hydroxybenzene,
4-nitro-6-acetylamino-2-amino-1-hydroxybenzene,
6-nitro-4-acetylamino-2-amino-1-hydroxybenzene,
4:6-dinitro-2-amino-1-hydroxybenzene,
1-amino-2-hydroxynaphthalene.

(b) Amines containing a single sulfonic acid group:

2-aminobenzene-1-carboxylic acid-4- or -5-sulfonic acid,
2-amino-1-hydroxybenzene-4- or -5-sulfonic acid,
4-chloro- or 4-methyl-2-amino-1-hydroxybenzene-5- or 6-sulfonic acid,
4-nitro-2-amino-1-hydroxybenzene-6-sulfonic acid,
6-nitro-2-amino-1-hydroxybenzene-4-sulfonic acid and above all
Naphthalene compounds, such as
2-amino-1-hydroxynaphthalene-4- or -8-sulfonic acid,
6-bromo-, 6-methoxy- or 6-methyl-1-amino-2-hydroxy-naphthalene-4-sulfonic acid and especially
1-amino-2-hydroxynaphthalene-4-sulfonic acid or
6-nitro-1-amino-2-hydroxynaphthalene-4-sulfonic-acid.

As coupling components there come into consideration those which are capable of coupling in a position vicinal to a primary or secondary amino group or a hydroxyl group, and among the latter there are included keto-compounds capable of coupling in a position vicinal to an enolized or enolizable keto-group.

As examples of suitable coupling components there may be mentioned:

(a) Coupling components free from sulfonic acid groups:

Hydroxybenzenes, such as para-cresol or para-tertiary amylphenol,
4-methyl-2-acetylamino-1-hydroxybenzene,
4-acetylamino-1-hydroxybenzene,
β-Keto-carboxylic acid esters or amides, such as
Acetoacetic acid anilide and
1-acetoacetylamino-2-, -3- or -4-chlorobenzene,
Pyrazolones, such as
1-phenyl-3-methyl-5-pyrazolone,
1:3-diphenyl-5-pyrazolone,
1-(2'-, 3'- or 4'-chlorophenyl)-3-methyl-5-pyrazolone,
1-(2'-, 3'- or 4'-methylphenyl)-3-methyl-5-pyrazolone,
1-(2':5'-dichlorophenyl)-3-methyl-5-pyrazolone,
1-(2'-ethylphenyl)-3-methyl-5-pyrazolone,
1-(naphthyl-(1')- or -(2'))-3-methyl-5-pyrazolone,
1-phenyl-5-pyrazolone-3-carboxylic acid phenylamide,
1-n-octyl-3-methyl-5-pyrazolone,
Hydroxyquinolines,
Barbituric acids,
Naphthalene derivatives, such as
6-bromo-, 6-methoxy- or 6-methyl-2-aminonaphthalene,
2-phenylaminonaphthalene,
2-aminonaphthalene itself and
2-aminonaphthalene-1-sulfonic acid which is known to couple to form the same dyestuffs as 2-aminonaphthalene with the splitting off of the —SO₃H group in the 1-position, and also 6-bromo- or 6-methoxy-2-hydroxynaphthalene and especially
1-acetylamino-7-hydroxynaphthalene, 1-n-butyrylamino-7-hydroxynaphthalene,
1-benzoylamino-7-hydroxynaphthalene,
1-carbethoxyamino-7-hydroxynaphthalene,
8-chloro-1-hydroxynaphthalene,
5-chloro-1-hydroxynaphthalene,
5:8-dichloro-1-hydroxynaphthalene,
5:8-dichloro-2-hydroxynaphthalene,
2-hydroxynaphthalene and, if desired,
1-hydroxynaphthalene.

(b) Coupling components containing a single sulfonic acid group:

1-phenyl-3-methyl-5-pyrazolone-2'-, -3'- or -4'-sulfonic acid,
1-(2'-chlorophenyl)-3-methyl-5-pyrazolone-4'- or -5'- sulfonic acid,
1-(2':5'-dichloro-phenyl)-3-methyl-5-pyrazolone-4'-sulfonic acid,
1-(naphthyl-(1'))-3-methyl-5-pyrazolone-4'-, -5'-, -6'-, -7'- or -8'-sulfonic acid,
1-(naphthyl-(2'))-3-methyl-5-pyrazolone-2'- or -8'-sulfonic acid,
1-acetoacetylaminobenzene-4-sulfonic acid and above all
2-amino- or 2-hydroxynaphthalene-4-, -5-, -6- or -7-sulfonic acid,
1-hydroxynaphthalene-3-, -4-, -5- or -8-sulfonic acid,
2-phenylaminonaphthalene-3'- or -4'-sulfonic acid,
2-phenylaminonaphthalene-6-sulfonic acid.

As is known, the 1:1-metal complexes of ortho:ortho'-dihydroxy-monoazo-dyestuffs can be made not only from the ortho:ortho'-dihydroxy-monoazo-dyestuffs themselves, but also from the corresponding ortho-alkoxy-ortho'-hydroxy-monoazo-dyestuffs. For making the metalliferous dyestuffs used as starting materials in the present process there may, therefore, generally be used, instead of the ortho-hydroxy-diazo compounds, the corresponding ortho-alkoxy-diazo-compounds, especially the methoxy compounds. As certain coupling components such, for example, as 2-hydroxynaphthalene-8-sulfonic acid and 2-aminonaphthalene-8-sulfonic acid are not capable of coupling with orthohydroxy-diazo compounds, the latter possibility enables 1:1-complexes of dyestuffs to be used which contain the residues of coupling components of this kind.

The 1:1-complexes used as starting materials in the present process can in other respects be made by the usual known methods, for example, by reacting the monoazo-dyestuff free from complex-forming metal, and advantageously the dyestuff which contains the sulfonic acid group, in an acid medium with an excess of a cobalt salt or advantageously a salt of trivalent chromium, such as chromium formate, chromium sulfate or chromium fluoride, at the boiling temperature or if desired at a temperature above 100° C. In order to convert a metal-free dyestuff containing no sulfonic acid group into its 1:1-complex it is generally of advantage to carry out the metallization in known manner, for example, in the presence of an organic solvent, such as alcohol or formamide.

In general it is of advantage to treat the starting materials in the present process after their manufacture and separation in the form of moist pastes, that is to say without drying them.

The reaction of the 1:1-metal complexes with the metal-free dyestuffs is advantageously carried out in an aqueous neutral to weakly alkaline medium, in an open or closed vessel, at the ordinary or a raised temperature, for example, at a temperature within the range of 50–120° C. It is generally recommended to react together the metalliferous 1:1-complex and the metal-free dyestuff in approximately equivalent quantities, the molecular ratio of the metal-free dyestuff to the 1:1-complex advantageously amounting to at least 0.85:1 and at most 1:0.85. An excess of the metalliferous dyestuff is generally less disadvantageous than an excess of the metal-free dyestuff. Generally speaking, the nearer the ratio approaches 1:1 the more advantageous is the result obtained.

The dyestuffs obtainable in the manner described above can also be obtained by a modification of the process in which an approximately equimolecular mixture of two different metallizable monoazo-dyestuffs, both of which are free from carboxylic acid groups in other than an ortho-position relatively to the azo linkage, and from functionally converted sulfonic acid groups and sulfone groups, and of which one contains a single free sulfonic acid group and the other is free from sulfonic acid groups, is treated with an agent yielding cobalt or chromium under conditions such that the resulting metalliferous azo dyestuff contains one atom of metal bound in complex union to one molecule of each of the two different monoazo-dyestuffs.

Mixtures of the two different dyestuffs to be metallized can be prepared not only by mixing the individual dyestuffs, but, for example, by coupling two mols of one of the above mentioned ortho-hydroxy-diazo-compounds free from sulfonic acid groups with one mol of each of two different coupling components of which only one contains a single sulfonic acid group. Conversely, 2 mols of a coupling component free from sulfonic acid groups may be coupled with one mol of each of two different diazo-compounds of which only one contains a single sulfonic acid group.

In carrying out this modification of the process it is generally of advantage to use a quantity of an agent yielding chromium or cobalt containing about one atomic proportion of metal for a mixture of one mol of each of two different dyestuffs and/or to carry out the metallization in a weakly acid to alkaline medium. Accordingly, there are especially suitable for carrying out this process those agents yielding chromium or cobalt which are stable in alkaline media such for example, as cobalt compounds of aliphatic hydroxy-carboxylic acids or dicarboxylic acids and especially chromium compounds of aromatic ortho-hydroxy-carboxylic acids, which contain the metal in complex union. As examples of aliphatic hydroxy-carboxylic acids there may be mentioned, inter alia, lactic acid, citric acid and especially tartaric acid, and as a dicarboxylic acid there may be mentioned oxalic acid. Among the aromatic hydroxy-carboxylic acids there may be mentioned those of the benzene series, such as 4-, 5- or 6-methyl-1-hydroxybenzene-2-carboxylic acid and above all 1-hydroxybenzene-2-carboxylic acid itself. As agents yielding cobalt, however, it is preferable to use simple cobalt salts, such as cobalt sulfate or if desired, freshly precipitated cobalt hydroxide.

The conversion of the dyestuffs into their complex chromium or cobalt compounds is advantageously carried out with the aid of heat, under atomspheric or superatmospheric pressure, for example, at the boiling temperature of the reaction mixture, if desired, in the presence of a suitable addition, for example, in the presence of a salt of an organic acid, a base, an organic solvent or another agent assisting the formation of the complex.

The products of the processes of the invention are metal compounds which contain two molecules of different monoazo-dyestuffs bound in complex union with one atom of cobalt or chromium, both of which dyestuffs are free from carboxylic acid groups in a position other than an ortho-position relatively to the azo linkage and from functionally converted sulfonic acid groups and sulfone groups and of which one contains a single free sulfonic acid group and the other is free from sulfonic acid groups, and which metal compounds are free from substantial quantities of metal compounds which contain one atom of chromium or cobalt per molecule of dyestuff or one atom of chromium or cobalt bound in complex union to two molecules of the same dyestuff.

When a product of this constitution obtainable by the present process still contains detectable amount of the 1:1-complex used as starting material, for example, about 0.1 mol of the 1:1-complex per mol of the 1:2-complex obtained as final product, it is in general desirable to convert this excess subsequently into a 1:2-complex of the kind described above.

The new chromiferous and cobaltiferous mixed complexes of the invention are suitable for dyeing and printing a very wide variety of materials, above all for dyeing animal materials, such as silk, leather and especially wool, but also for dyeing and printing synthetic fibers of superpolyamides, superpolyurethanes or polyacrylonitrile. They are especially suitable for dyeing from weakly alkaline, neutral or weakly acid, for example, acetic acid, baths. The dyeings so produced are level and possess a good fastness to light, washing, fulling, decatizing and carbonizing.

The following examples illustrate the invention, the percentages being by weight, and "1 mol" meaning, as is usual, the molecular weight of the substance in grams. However, the quantities may be increased, for example, to 10 or 1000 times the values given. When the dyestuffs used as starting materials are not in a pure form, for example, in the form of closely defined dyestuff acids or dyestuff salts, but contain, for example, as the result of being precipitated by salting out, foreign substances which have substantially no adverse effect on the reaction, such dyestuffs can normally be used in that form with good success. However, it is then necessary to determine the content of pure dyestuff by any known method, for example, by titration of the azo groups:

Example 1

0.01 mol of the chromium complex containing one molecule of dyestuff bound in complex union with one atom of chromium and obtained from the dyestuff from nitrated 1-diazo-2-hydroxynaphthalene-4-sulfonic acid and 2-hydroxynaphthalene is heated to 90° C. with 0.01 mol of the dyestuff from diazotized 5-nitro-2-amino-1-hydroxybenzene and 2-hydroxynaphthalene in 200 cc. of water with the addition of 10 cc. of a 2 N-solution of sodium carbonate, and then the whole is maintained at 90-100° C. for one hour. The reaction mixture is then evaporated to dryness. The resulting dyestuff dyes wool from a neutral or acetic acid bath level black tints which are fast to washing, fulling and light.

Example 2

0.01 mol of the complex chromium compound containing one atom of chromium bound in complex union with one molecule of dyestuff and obtained from the dyestuff from diazotized 1-amino-2-hydroxynaphthalene-4-sulfonic acid and 2-hydroxynaphthalene is heated to 90° C. with 0.01 mol of the dyestuff from diazotized 5-nitro-2-amino-1-hydroxybenzene and 2-hydroxynaphthalene in 200 cc. of water with the addition of 10 cc. of a 2 N-solution of sodium carbonate, and then the whole is maintained at 90-95° C. for one hour. The reaction mixture is then evaporated to dryness. The dyestuff so obtained dyes wool from a neutral to acetic acid bath level navy blue tints which are fast to washing, fulling and light.

Example 3

0.01 mol of the complex chromium compound containing one atom of chromium bound in complex union with one molecule of dyestuff and obtained from the dyestuff from diazotized 1-amino-2-hydroxynaphthalene-4-sulfonic acid and 1-phenyl-3-methyl-5-pyrazolone is boiled with 0.01 mol of the dyestuff from diazotized 5-nitro-2-amino-1-hydroxybenzene and 1-phenyl-3-methyl-5-pyrazolone in 200 cc. of water with the addition of 10 cc. of a 2 N-solution of sodium carbonate for one hour under reflux. The reaction mixture is then evaporated to dryness. The dyestuff so obtained dyes wool from a neutral to acetic acid bath level bluish red tints which are fast to washing, fulling and light.

Example 4

0.01 mol of the complex chromium compound containing one atom of chromium bound in complex union per molecule of dyestuff and obtained from the dyestuff from diazotized 4-chloro-2-amino-1-hydroxybenzene-6-sulfonic acid and 1-phenyl-3-methyl-5-pyrazolone is boiled under reflux for one hour with 0.01 mol of the dyestuff from diazotized 4-chloro-6-nitro-2-amino-1-hydroxybenzene and 1-phenyl-3-methyl-5-pyrazolone in 300 cc. of water with the addition of 10 cc. of a 2 N-solution of sodium hydroxide. The reaction mixture is then evaporated to dryness in vacuo. The dyestuff so obtained dyes wool from a neutral or acetic acid bath level red tints which are fast to washing, fulling and light.

In the following table are given a few further chromiferous dyestuffs (1:2-complexes), which are obtained by reacting in the molecular ratio 1:1 the chromium-free dyestuff given in column I with the 1:1-chromium complex compound given in column II in the manner described in the above example:

| | I Chromium-free dyestuff from | II Chromiferous dyestuff from | III Tint on wool |
|---|---|---|---|
| 1 | 4-nitro-2-amino-1-hydroxybenzene+2-hydroxynaphthalene. | 4-nitro-2-amino-1-hydroxybenzene-6-sulfonic acid +1-phenyl-3-methyl-5-pyrazolone. | Brown. |
| 2 | 5-nitro-2-amino-1-hydroxybenzene+2-hydroxynaphthalene. | 4-chloro-2-amino-1-hydroxybenzene+1-hydroxynaphthalene-5-sulfonic acid. | Navy blue. |
| 3 | 4-nitro-6-chloro-2-amino-1-hydroxybenzene+2-hydroxynaphthalene. | 4-nitro-2-amino-1-hydroxybenzene-6-sulfonic acid +1-phenyl-3-methyl-5-pyrazolone. | Brown. |
| 4 | 4-nitro-2-amino-1-hydroxybenzene+1-phenyl-3-methyl-5-pyrazolone. | 4-nitro-2-amino-1-hydroxybenzene-6-sulfonic acid +2-hydroxynaphthalene. | Do. |
| 5 | 4-nitro-2-amino-1-hydroxybenzene+1-(4'-chlorophenyl)-3-methyl-5-pyrazolone. | ___do___ | Do. |
| 6 | 4-nitro-6-chloro-2-amino-1-hydroxybenzene+1-phenyl-3-methyl-5-pyrazolone. | ___do___ | Do. |
| 7 | 4-chloro-2-amino-1-hydroxybenzene+2-hydroxynaphthalene. | 5-nitro-2-amino-1-hydroxybenzene+2-aminonaphthalene-6-sulfonic acid. | Grey. |
| 8 | 4-nitro-6-chloro-2-amino-1-hydroxybenzene+4-n-butyrylamino-1-hydroxybenzene. | 4-nitro-2-amino-1-hydroxybenzene-6-sulfonic acid +2-hydroxynaphthalene. | Brownish grey. |
| 9 | 4-chloro-2-amino-1-hydroxybenzene+5:8-dichloro-1-hydroxynaphthalene. | 1-amino-2-hydroxynaphthalene-4-sulfonic acid+2-hydroxynaphthalene. | Navy blue. |
| 10 | 4-chloro-2-aminophenol+2-hydroxynaphthalene. | 1-amino-2-hydroxynaphthalene-4-sulfonic acid+5:8-dichloro-1-hydroxynaphthalene. | Do. |
| 11 | 4-chloro-2-aminophenol+5:8-dichloro-1-hydroxynaphthalene. | ___do___ | Do. |
| 12 | 4-nitro-6-chloro-2-aminophenol+4-tertiaryamyl-1-hydroxybenzene. | 4-nitro-2-aminophenol-6-sulfonic acid+2-hydroxynaphthalene. | Black brown. |
| 13 | 5-nitro-2-aminophenol+2-hydroxynaphthalene. | 1-amino-2-hydroxynaphthalene-4-sulfonic acid+5:8-dichloro-1-hydroxynaphthalene. | Navy blue. |
| 14 | 2-aminobenzoic acid+1-(2'-ethylphenyl)-3-methyl-5-pyrazolone. | 5-nitro-2-amino-1-hydroxybenzene+2-aminonaphthalene-6-sulfonic acid. | Green. |
| 15 | 4-nitro-2-amino-1-hydroxybenzene+1-phenyl-3-methyl-5-pyrazolone. | 4-chloro-2-amino-1-hydroxybenzene-6-sulfonic acid +2:4-dihydroxychinolin. | Red brown. |

The chromiferous dyestuff No. 1 of the table is the complex chromium compound containing one atom of chromium bound in complex union with one molecule of each of the two monoazo dyestuffs of the formulae

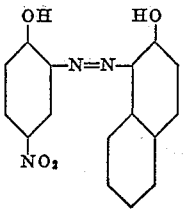

and

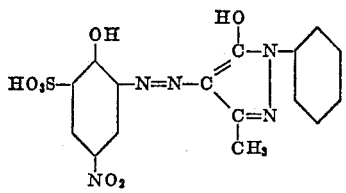

The chromiferous dyestuff No. 5 of the table is the complex chromium compound containing one atom of chromium bound in complex union with one molecule of each of the two monoazo dyestuffs of the formulae

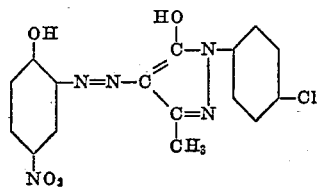

and

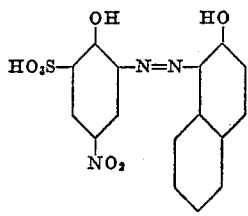

The chromiferous dyestuff No. 13 of the table is the complex chromium compound containing one atom of chromium bound in complex union with one molecule of each of the two monoazo dyestuffs of the formulae

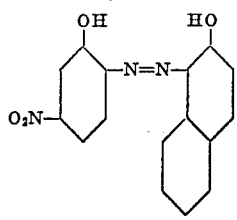

and

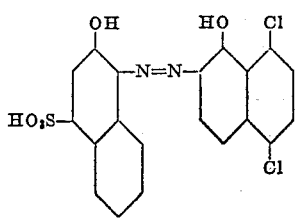

*Example 5*

0.01 mol of the complex chromium compound containing one atom of chromium bound in complex union per molecule of dyestuff and obtained from the dyestuff from diazotized 1-amino-2-hydroxynaphthalene-4-sulfonic acid and 5:8-dichloro-1-hydroxynaphthalene is heated to 75° C. with 0.01 mol of the dyestuff from diazotized 2-aminobenzoic acid and 1-(2'-ethylphenyl)-3-methyl-5-pyrazolone in 400 cc. of water with the addition of 10 cc. of a 2 N-solution of sodium hydroxide, and then the whole is stirred for one hour at 75–80° C. and for four hours at 85–90° C. The complex chromium compound so formed is precipitated from the reaction mixture by the addition of 40 grams of sodium chloride, and then filtered off, washed with 500 cc. of sodium chloride solution of 10 percent strength, and dried. It is the complex chromium compound containing one atom of chromium bound in complex union with one molecule of each of the two monoazo dyestuffs of the formulae and It dyes wool from a neutral bath level green tints which are fast to washing, fulling and light.

*Example 6*

0.011 mol of the complex chromium compound containing one atom of chromium bound in complex union per molecule of dyestuff and obtained from the dyestuff from nitrated 1 - diazo-2-hydroxynaphthalene-4-sulfonic acid and 2-hydroxynaphthalene are heated to 75° C. with 0.01 mol of the dyestuff from diazotized 4:6-dinitro-2-amino-1-hydroxybenzene and 2-hydroxynaphthalene in 400 cc. of water with the addition of 10 cc. of a 2 N-solution of sodium hydroxide, and then the whole is stirred for one hour at 75–80° C. and for four hours at 85–90° C. The mixed chromium complex so formed is precipitated from the reaction mixture by the addition of 30 grams of sodium chloride, filtered off and dried. It is the complex chromium compound containing one atom of chromium bound in complex union with one molecule of each of the two monoazo dyestuffs of the formulae and It dyes wool from a neutral bath level black tints which are fast to washing, fulling and light.

A similar dyestuff is obtained by using in this example, instead of 4:6-dinitro-2-amino-1-hydroxybenzene, the equivalent quantity of 5-nitro-4-chloro-2-amino-1-hydroxybenzene.

Example 7

0.01 mol of the dyestuff from nitrated 1-diazo-2-hydroxynaphthalene-4-sulfonic and 5:8-dichloro-1-hydroxynaphthalene is boiled under reflux for two hours with 0.01 mol of the dyestuff from diazotized 5-nitro-2-amino-1-hydroxybenzene and 2-hydroxynaphthalene in 400 cc. of water with the addition of 10 cc. of a 2 N-solution of sodium hydroxide and 80 grams of a solution of sodium chromosalicylate having a chromium content of 2.6 percent. The complex chromium compound so formed is precipitated from the reaction mixture by the addition of 50 grams of sodium chloride and boiling for a short time, filtered off and dried. It dyes wool from a neutral bath black-blue tints which are fast to washing, fulling and light.

Example 8

0.01 mol of the dyestuff from diazotized 4-chloro-2-amino-1-hydroxybenzene and 2-hydroxynaphthalene-6-sulfonic acid is heated to 80° C. with 0.01 mol of the dyestuff from 4-chloro-2-amino-1-hydroxybenzene and 5:8-dichloro-1-hydroxynaphthalene in 250 cc. of water with the addition of 25 cc. of a 2 N-solution of sodium hydroxide. There are then added 20 cc. of a solution of cobalt sulfate having a cobalt content of 3.25 percent, and the whole is stirred for ½ hour at 80–85° C. If required the mixture is filtered to remove a small amount of impurities. The complex cobalt compound so formed is precipitated from the solution by the addition of sodium chloride and neutralization with dilute acetic acid, filtered off and dried. The resulting water-soluble cobaltiferous dyestuff dyes wool from a neutral or acetic acid bath level Bordeaux tints which are fast to washing, fulling and light.

A cobaltiferous dyestuff which dyes wool from a neutral or acetic acid bath yellow brown tints is obtained, if one used in this example instead of the indicated starting dyestuffs 0.01 mol of the monoazo dyestuff from diazotized 4-chloro-2-amino-1-hydroxybenzene and 2-hydroxynaphthalene-6-sulfonic acid and 0.01 mol of the monoazo dyestuff from diazotized 4-nitro-2-amino-1-hydroxybenzene and acetoacetic acid anilide.

Example 9

4 parts of the chromiferous dyestuff obtained as described in Example 1 are dissolved in 4000 parts of water, and 100 parts of well wetted wool are entered at 40–50° C. into the resulting dyebath. 2 parts of acetic acid of 40 percent strength are then added, the bath is raised to the boil in the course of ½ hour and dyeing is carried on at the boil for ¾ hour. Finally the wool is rinsed with cold water and dried. It is dyed a black tint of good fastness to light and washing.

A black dyeing is also produced when the dyebath contains no addition of acetic acid, and when superpolyamide fibers (nylon fibers) are dyed as described above, instead of wool.

What is claimed is:
1. A complex chromium compound which contains one atom of chromium bound in complex union with one molecule each of two different ortho:ortho'-dihydroxy monoazo dyestuffs free from carboxylic acid groups, of which one corresponds to the formula

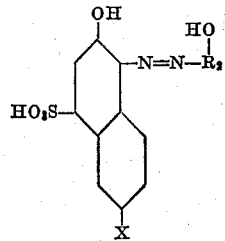

in which X represents a member selected from the group consisting of a hydrogen atom and a nitro group and R₂ represents a naphthalene residue bound to the azo linkage in a position vicinal to the hydroxyl group, both monoazo dyestuffs being free from carboxylic acid groups and containing together, as sole sulfur-bearing substituents, the single sulfonic acid group shown in the said formula.

2. The complex chromium compound containing one atom of chromium bound in complex union with one molecule of each of the two monoazo dyestuffs for the formulae

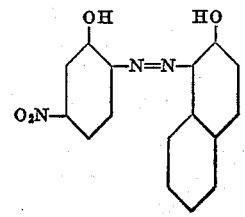

and

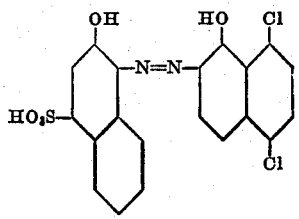

References Cited in the file of this patent

UNITED STATES PATENTS

| | | |
|---|---|---|
| 2,012,779 | Straub et al. | Aug. 27, 1935 |
| 2,565,898 | Widmer et al. | Aug. 28, 1951 |
| 2,610,175 | Widmer et al. | Sept. 9, 1952 |
| 2,673,199 | Widmer et al. | Mar. 23, 1954 |
| 2,674,515 | Widmer et al. | Apr. 6, 1954 |
| 2,711,404 | Schetty | June 21, 1955 |
| 2,727,031 | Zickendraht et al. | Dec. 13, 1955 |
| 2,806,760 | Brassel et al. | Sept. 17, 1957 |

FOREIGN PATENTS

| | | |
|---|---|---|
| 513,360 | Belgium | Feb. 6, 1953 |

UNITED STATES PATENT OFFICE
CERTIFICATE OF CORRECTION

Patent No. 2,906,746 September 29, 1959

Jakob Brassel et al.

It is hereby certified that error appears in the printed specification of the above numbered patent requiring correction and that the said Letters Patent should read as corrected below.

Column 4, lines 56 and 57, for "atomspheric" read -- atmospheric --; column 10, line 26, for "for" read -- of --.

Signed and sealed this 17th day of May 1960.

(SEAL)
Attest:

KARL H. AXLINE
Attesting Officer

ROBERT C. WATSON
Commissioner of Patents